Aug. 31, 1926.
R. A. BOOKER
1,598,045
PISTON RING
Filed March 30, 1922
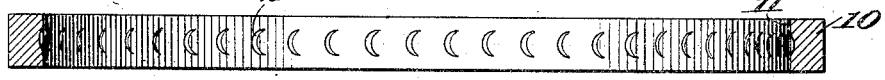
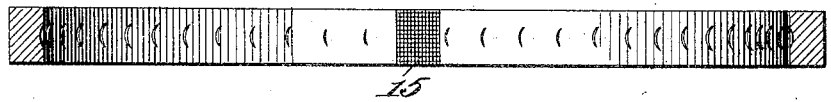
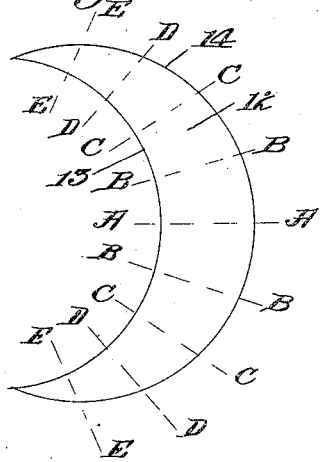
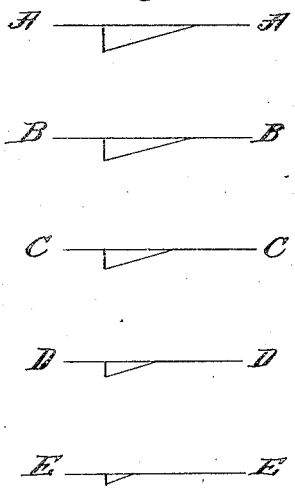
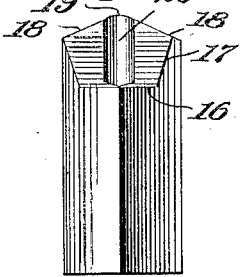
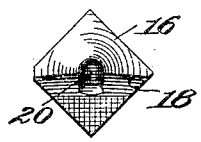
Inventor:
Richard Booker
By Cushman, Bryant & Darby
Att'ys.

Patented Aug. 31, 1926.

1,598,045

UNITED STATES PATENT OFFICE.

RICHARD A. BOOKER, OF RICHMOND, INDIANA.

PISTON RING.

Application filed March 30, 1922. Serial No. 548,111.

This invention relates to an improvement in piston ring construction, and especially that type wherein the indentations are formed in the inner wall of the ring, the indentations being so formed as to cause a uniform radial spring pressure upon the ends when the ring is finally severed.

No claim is made in this case to the peining tool, which feature has been covered in Patent No. 1,585,327, dated May 18, 1926.

It has heretofore been the custom to make resilient piston rings by splitting the rings and then tensioning them by hammering the interior wall thereof so as to force the split ends apart.

In my improved form of ring, the indentations are formed before the ring is split and displaces the molecules over a curved line or area, in contrast to the wedge or channel impressions heretofore used. By my method the metal is densified in the interior wall of the ring over a substantially lune shaped area without in any way altering the cross section and with blows so varied circumferentially of the ring as to produce the maximum densification diametrically opposite a point where the ring is to be split, gradually diminishing the impact of the peining tool in opposite directions from the point of greatest impact.

A further object of my invention consists in forming a substantially lune shaped depression in the interior wall of a piston ring so that the greatest depth and width of the depression or indentation is at the center of the interior wall, which indentation gradually and uniformly decreases in depth and width as it approaches the edges of the ring.

Another object of my invention consists in the employing of a peining tool so formed as to provide a peining point or face capable of producing a lune shaped depression.

In the drawings:—

Fig. 1 is a horizontal sectional view showing the interior wall of a piston ring peined in accordance with my invention.

Figs. 2 and 3 are horizonal sectional views, looking at the inside of the piston ring at a point diametrically opposite to Fig. 1, and showing, respectively, the ring before and after it is split.

Fig. 4 is a diagrammatic view to illustrate the lune shaped impression formed by the peining tool on the inner wall of the ring.

Fig. 5 shows a series of cross-sectional views taken at the points indicated on Fig. 4.

Fig. 6 is a side elevation of the peining tool showing one manner of forming the peining point.

Fig. 7 is a plan view of the peining tool.

Referring to the drawings, wherein like numerals indicate like parts in the various figures, 10 indicates a circular piston ring having formed in its interior wall 11 a series of peined indentations or depressions 12 of substantially lune shape, and so formed as to make their deepest impression at the center point of the interior arc 13 of the lune, and gradually and uniformly decrease the extent of the impression along the interior arc of the lune as the same approaches the apices of that interior arc 13 and the exterior arc 14, at which point the impression coincides or becomes flush with the inner wall 11 of the ring, as best shown in Figs. 4 and 5.

The ring 10 will preferably be marked in any suitable fashion, as at 15, at some point on its inner periphery so that the peining or hammering of the ring will be such that the maximum impact will be at a point diametrically opposite this mark 15, and the impact will gradually diminish in opposite directions around the inner circumference of the ring so that the mark 15 will be approached on opposite sides by gradually diminishing peining blows.

By marking the ring in this manner the action of the peining hammer may be accurately graduated with reference to a certain point, namely the point 15, and after peining the ring will be cut at the point 15, as illustrated in Figure 3, so that severance of the ring will take place at the proper point to secure the best results and an accurate and uniform expansion.

The peining tool, which is illustrated in Figures 6 and 7, is preferably made as shown with a base 16 formed by cutting away one side of the blank 17, of which the tool is made, and said tool has its peining face 18 formed as a true conical surface sloping uniformly in all directions from its apex 19, which apex is cut away at 20, as shown by a groove, so as to give a curved base to the conical peining surface from which the lune shaped indentation will be generated upon a blow of the peining tool. This insures formation of the lune-shaped indentation, heretofore described, with its greatest depth at the center of the lune and gradually decreasing from the center of its inner arc 13 toward its apices and also outwardly toward its outer arc 14.

With this tool, and following my method, the peining blow is so distributed that danger of breakage along the peining area is eliminated for the greatest depth and width of the indentation is at the center of the ring and gradually decreases and changes its direction as it approaches the edges of the ring, thus distributing the impact of the peining blow to the indented area and eliminating any stresses which tend to weaken the ring along definite lines.

It is to be understood that the form of the invention herewith shown and described is to be taken as a preferred embodiment of the same, and that such minor changes in construction and arrangement of parts may be made as will remain within the spirit of the invention and the scope of what is claimed.

Having thus described the invention, what is claimed as new is:—

A piston ring having a series of curved indented lunes located on the interior wall of the ring, said indentions making their deepest impressions at the center point of the interior arc of the lune, and decreasing in amount of impression on the interior arc of the lune uniformly towards the apex of the interior and exterior arcs of the lune, at which point the impression becomes flush with the interior wall of the ring.

In testimony whereof I have hereunto set my hand.

RICHARD A. BOOKER.